United States Patent [19]

Bugeja

[11] Patent Number: 4,574,737
[45] Date of Patent: Mar. 11, 1986

[54] STRUCTURE FOR HOUSING ANIMALS

[76] Inventor: Joseph C. Bugeja, 103 Beames Ave., Rooty Hill, New South Wales, Australia, 2766

[21] Appl. No.: 638,455

[22] PCT Filed: Nov. 30, 1983

[86] PCT No.: PCT/AU83/00174
§ 371 Date: Aug. 1, 1984
§ 102(e) Date: Aug. 1, 1984

[87] PCT Pub. No.: WO84/02254
PCT Pub. Date: Jun. 21, 1984

[30] Foreign Application Priority Data
Dec. 8, 1982 [AU] Australia .................. PF7169
Mar. 21, 1983 [AU] Australia .................. 12657/83

[51] Int. Cl.⁴ .................................................. A01K 1/00
[52] U.S. Cl. ............................................ 119/16; 119/21
[58] Field of Search ................. 119/16, 17, 18, 21, 119/22, 28; 52/198, 199

[56] References Cited

U.S. PATENT DOCUMENTS

| 3,694,222 | 9/1972 | Pardoel et al. | 119/16 |
| 3,919,976 | 11/1975 | Meyer et al. | 119/16 |
| 4,442,792 | 4/1984 | Nehring | 119/16 |
| 4,462,334 | 7/1984 | Kim | 119/16 |

FOREIGN PATENT DOCUMENTS

| 66838 | 12/1982 | European Pat. Off. | 119/16 |
| 2636052 | 2/1977 | Fed. Rep. of Germany | 119/16 |
| 2812229 | 10/1979 | Fed. Rep. of Germany | 119/16 |

Primary Examiner—Jay N. Eskovitz
Attorney, Agent, or Firm—Townsend and Townsend

[57] ABSTRACT

A structure for housing plants and animals, particularly poultry, in a controlled environment, comprises a base and opposite sides inclined towards an apex at which there is provided an opening. A ceiling is provided inside the structure over the plants or animals. The ceiling is opened to allow hot air trapped below it to pass out through the opening in the apex, thereby cooling the interior. To heat the interior, the ceiling is closed to retain the heat generated by the plants or animals as well as solar generated heat. Vents are preferably provided in the sides of the structure to allow cooling air to be drawn in when the ceiling is opened.

12 Claims, 7 Drawing Figures

STRUCTURE FOR HOUSING ANIMALS

The present invention relates to an improved structure for housing animals, such as poultry, the structure being designed such that its interior is maintainable within an acceptable temperature range and with sufficient light with minimum energy required.

BACKGROUND ART

It is known that animals such as poultry are very susceptible to extremes in temperature. A substantial proportion of a poultry farmer's flock may die if the temperature inside the poultry shed becomes too hot or too cold. Even with minor variations in temperature, egg production may fall significantly. The preferred temperature is from 19° to 30° celsius. Variations above or below 19° to 30° can reduce egg production efficiency from 80% to 50% for example. Even minor variations above 26° or below 20° can reduce efficiency by 5%. (100% egg production efficiency is taken to be production of one egg per hen per day). It has also been found that average egg production is higher during spring and autumn when the temperature does not vary as much as during summer and winter.

As most poultry sheds are of sheet iron construction, the inside of the shed is not effectively insulated from the outside environment and the inside temperature will vary significantly. In fact, the temperature inside the sheet iron poultry shed during summer days can be a great deal higher than the outside air temperature. A further factor which affects the temperature inside the poultry shed is the body heat produced by the chickens. In a typical chicken shed, the cages may be stacked three high across the width of the shed, and there may be up to 300 chickens per meter along the length of the shed. As each chicken produces approximately 31 BTU per hour, the body heat produced by the chickens is of the order of 10,000 BTU per hour per meter of length of chicken shed. If adequate cooling is not provided, the effect of body heat can result in the death of a high proportion of the chickens.

It has been known to provide air conditioning and cooling systems during summer and hot days, as well as heating systems during winter and cold nights. Such cooling and heating systems are very expensive however, due to the large space to be cooled or heated, as the case may be.

SUMMARY OF THE INVENTION

It is an object of the present invention to overcome, or substantially ameliorate and above described disadvantage by providing a structure for housing animals in which the inside temperature may be maintained substantially constant with a minimum of energy. Preferably, the design allows natural light to be sufficient for daytime lighting. The structure can also be used for housing plants.

According to the present invention there is provided a structure for housing animals such as poultry, or plants, said structure having a base, and opposite sides inclined towards an apex at which there is provided an opening; a ceiling situated a predetermined distance above the base, said ceiling being adapted to be opened to allow the flow of air from below the ceiling to the opening at the apex of said shed, and closed to generally retain air within said structure.

Preferably, lateral extensions are provided at the sides of the structure, the lateral extensions having passageways for the flow of air from the outside to the interior of the structure. The ceiling is divided into two lengthwise, and each half is horizontally retractable from within the structure into a respective passageway in the lateral extensions on the sides of the structure.

In another form of the invention, the ceiling is divided into two and each half is pivotally hinged at a respective side of the structure so that it can be pivoted upwardly to lie against the side of the structure.

Preferably, transparent or translucent sections are provided in the sides of the structure and in the ceiling. The transparent or translucent sections in the ceiling alternate with those in the sides.

DESCRIPTION OF PREFERRED EMBODIMENT

Notwithstanding any other forms of the present invention, preferred embodiments thereof will now be described with references to the drawings in which.

Figure 1:
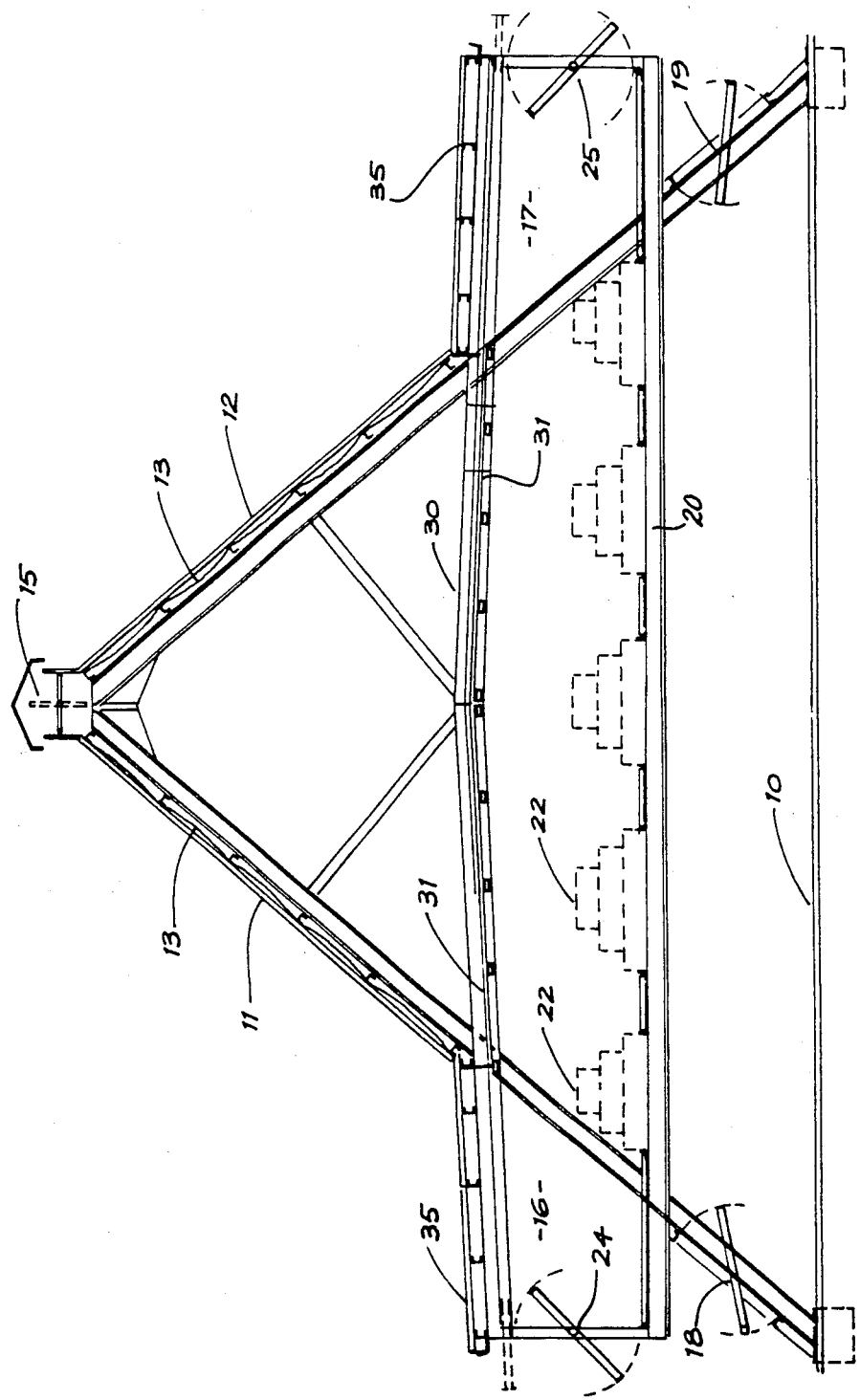
FIG. 1 is a cross sectional elevational view of a structure according to a preferred embodiment of the present invention.
Figure 2:
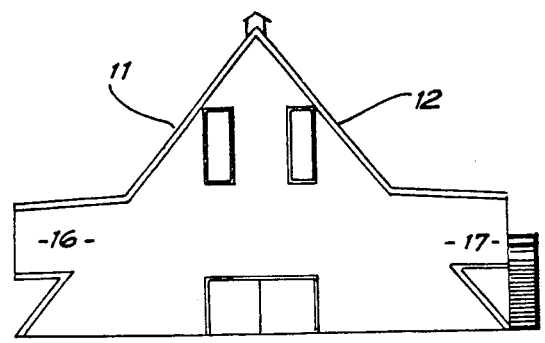
FIG. 2 is a elevational veiw of the embodiment of FIG. 1.
Figure 3:
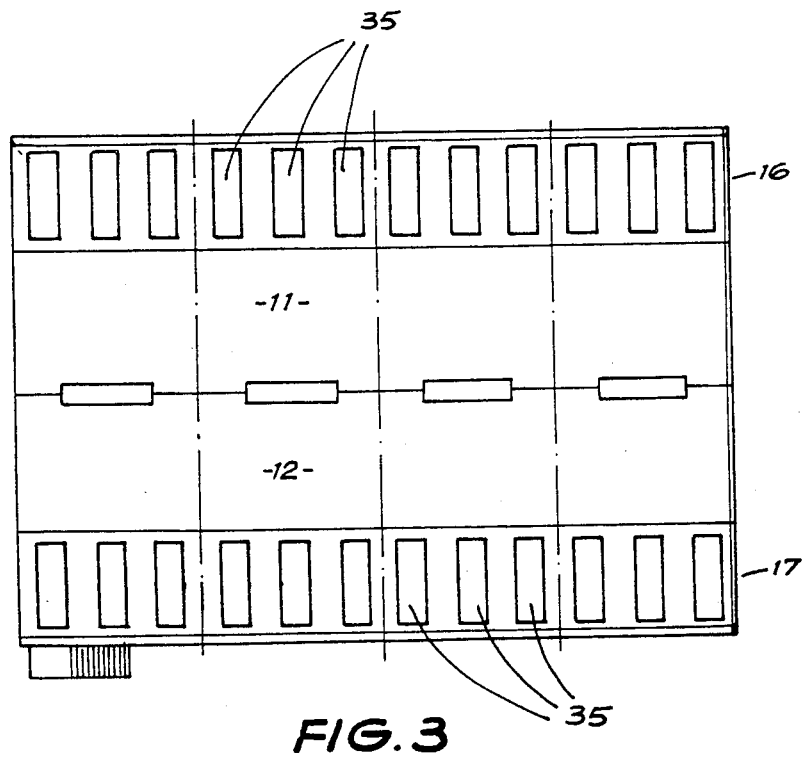
FIG. 3 is a plan view of the embodiment of FIG. 1.

Turning to FIGS. 1 to 3, the illustrated structure comprises two sides 11, 12 mounted on a base 10 and inclined towards an apex at which there is provided an opening such as a ventilation ridge 15. Typically, the sides 11, 12 are constructed from rib metal roof sheeting on a steel frame. The sides 11, 12 are preferably orientated at an angle of between 40° to 65° to the base. Sheet insulation 13 can be provided inside the roof sheeting. At a certain distance above the base 10, typically 2 meters, there is provided a platform 20 which extends across the width of the structure. The platform 20 extends also into lateral extensions 16, 17 which are provided on the sides 11, 12.

A ceiling 30 extends across the width of the structure at a predetermined height above the platform 20. As illustrated in FIG. 1, the lateral extensions 16, 17 are constructed such that the roof of the extensions is just above the ceiling 30.

The illustrated structure is suitable for housing poultry, and stacks of poultry cages 22 are arranged on the platform 20. For a platform width of approximately 12 meters, there may be 300 chickens per meter of length of the structure by stacking the cages up to three high. As mentioned earlier, thhe body heat generated by these chickens can raise the temperature inside the structure quite considerably, and adequate cooling must be provided to maintain efficiency and to prevent the poultry from expiring.

With the fixed ceiling, the hot air which has been heated by the outside environment and the body heat of the poultry would be trapped below the ceiling and would continue to rise in temperature. However, the ceiling 30 of the described embodiment is split in two lengthwise and each half is horizontally retractable into the lateral extensions 16, 17. Thus, the hot air is free to rise to the apex of the structure and exit via the ventilation ridge 15. As the hot air rises toward the apex, it is compressed and the flow per unit area is increased. The flow of the hot air through the ventilation ridge 15 draws in fresh air from outside via vents 18, 19 provided at the bottom of the sides 11, 12. Vents 24, 25 are also provided at the ends of the extensions 16, 17 and allow fresh air to be brought in from the sides of the chicken stacks. As the fresh air is brought in from under and from the sides of the cage stacks 22, the chickens are cooled effectively.

The flow of hot air through the ventilation ridge 15 can be used to drive a turbogenerator which, in turn, can be used to power lighting for the structure and/or additional refrigeration.

At cold times, when it is desired to heat the interior of the structure, the ceiling is closed and the vents are either closed or restricted. The hot air generated by the body heat of the poultry is then trapped inside the structure and is used to heat the inside environment. Transparent or translucent sheeting may be provided in sections along the sides of the structure, the roof of the extensions 16, 17 and in the ceiling 30. The transparent or translucent sections allow light to penetrate inside the structure and to warm the air. Preferably, the transparent or translucent sheeting 31 in the ceiling 30 is arranged alternately with the transparent or translucent sheeting 35 in the roof of the lateral extensions 16, 17 so that when the ceiling is opened to cool the inside, the transparent or translucent sheeting sections 31 of the ceiling overlap with the rib metal sheeting of the roof of extensions 16, 17, and vice versa. In this manner, shade is provided to cool the inside of the structure.

A solar powered heating system can also be provided to warm the inside during cold times. The heating system, for example, can include a closed piping system through which water is pumped along the outside of the building where it is heated by solar energy and then passed in front of the vents and along the base where the heated water will transfer its heat to the air inside the structure.

Figure 4:
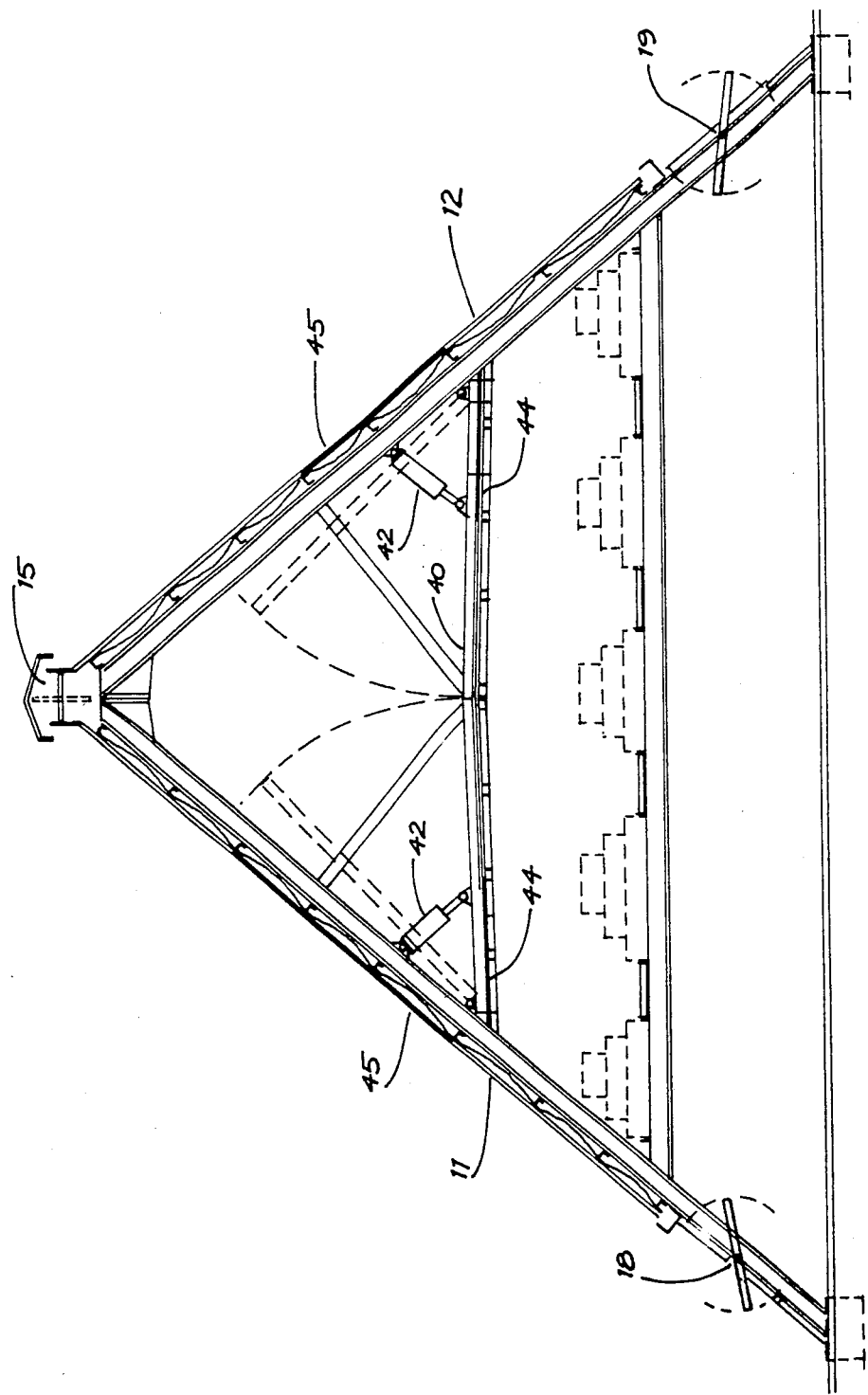
FIG. 4 is a cross sectional elevational view of another embodiment of the present invention.
Figure 5:
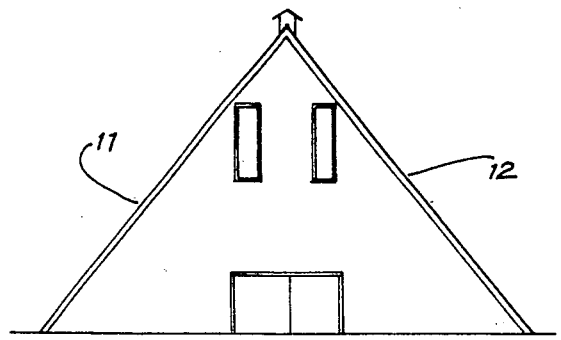
FIG. 5 is a elevational view of the embodiment of FIG. 4.
Figure 6:
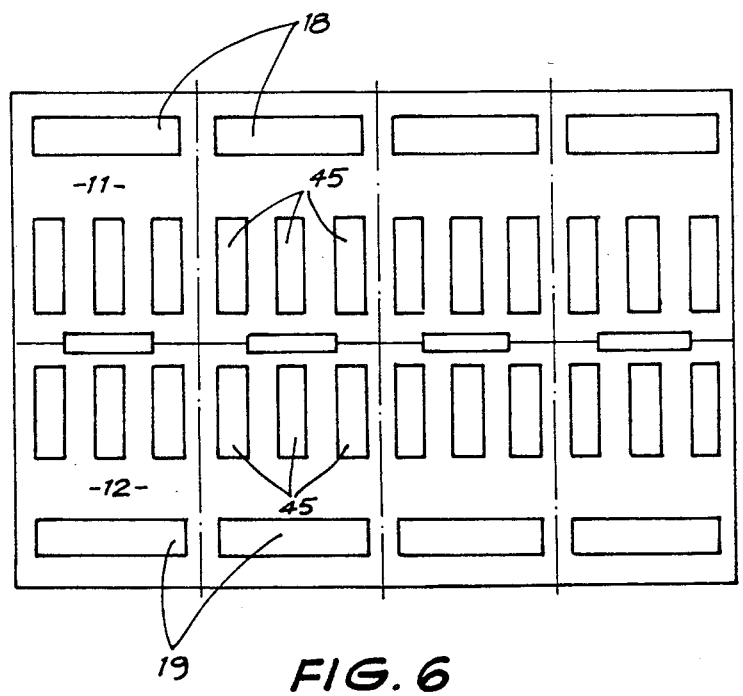
FIG. 6 is a plan view of the embodiment of FIG. 4.

In a further embodiment of the invention, illustrated in FIGS. 4 to 6, the ceiling 40 is divided into two lengthwise, and each half is pivotally hinged to a respective side 11, 12 of the structure. By means of a responsive hydraulic ram 42, each half of the ceiling can be lifted upwardly to lie against the corresponding side 11, 12. Hot air inside the structure is then able to exit via the ventilation ridge 15 and cool air is brought in via vents 18, 19. Transparent or translucent sheeting sections 44 provided in the ceiling 40 are arranged alternately with corresponding sections 45 in the sides of the structure. Thus, when the ceiling is raised, shade is provided to cool the inside. Yet, when the ceiling is lowered, the light can filter in via the transparent or translucent sections in the sides and in the ceiling to warm the air inside the structure.

Figure 7:
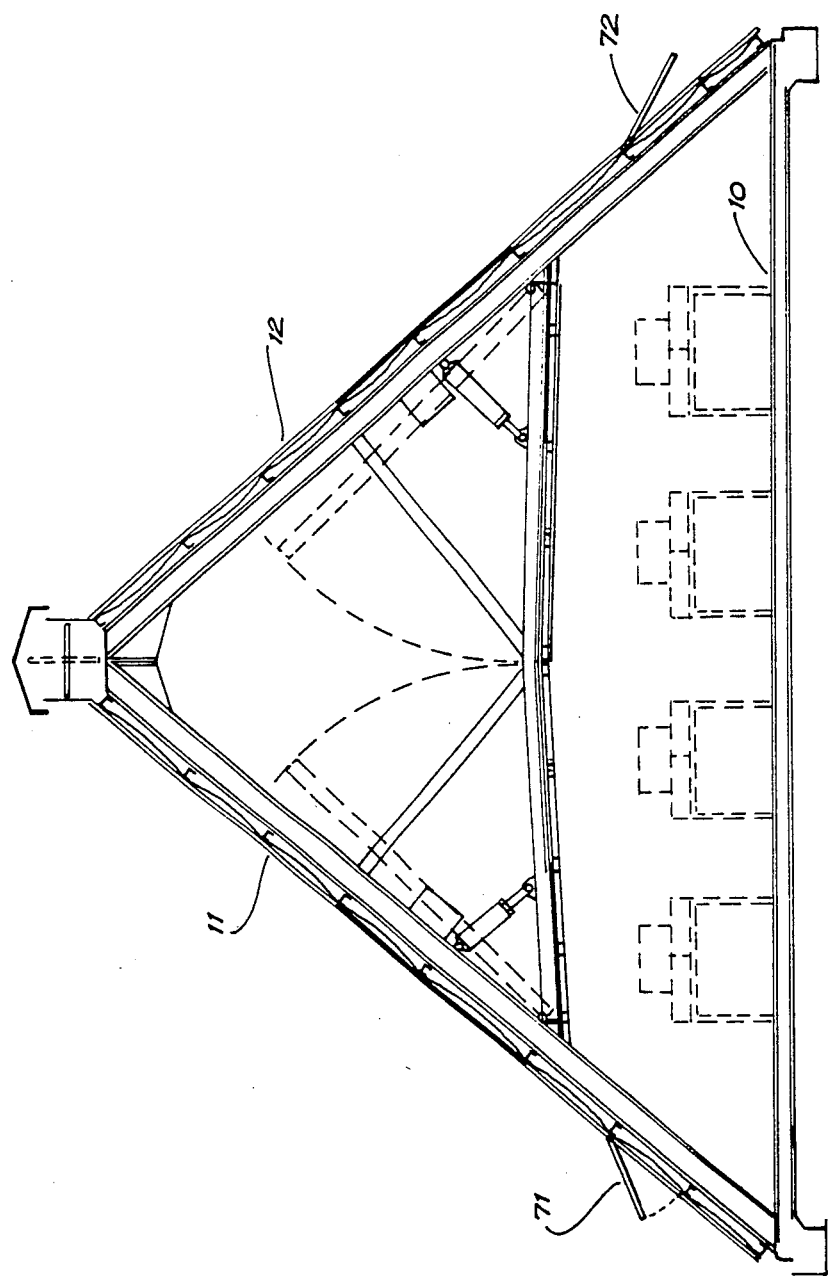
FIG. 7 is a cross sectional elevational view of still another embodiment of the present invention.

A further embodiment of the present invention is illustrated in FIG. 7. In this embodiment, the cage stacks are mounted on the base 10 of the structure. Hinged vented windows 71, 72 are provided at the base of the sides 11, 12 to allow cool air to be brought in from the outside. Such a structure can be used for other animals, such as pigs.

The foregoing describes only some embodiments of the present invention, and modifications which are obvious to those skilled in the art may be made thereto without departing from the scope of the invention as defined in the following claims. For example, the described structure can be used as a controlled environment for plants.

I claim:

1. A structure for housing animals such as poultry, said structure being of A-frame design and having a base, and opposite sides inclined towards an apex at which there is provided an opening, said structure having therein an area for accommodating cages for housing said animals; a ceiling situated above and near the cages, said ceiling being adapted to be opened to allow the flow of air from below the ceiling to the opening at the apex of said structure, and closed to generally retain air within said structure below the ceiling; and air vents at the base of said opposite sides.

2. A structure as claimed in claim 1 wherein the ceiling is horizontally movable.

3. A structure as claimed in claim 2 wherein horizontal lateral extensions are provided at the sides of the structure, said extensions having passageways adapted to receive said ceiling or parts thereof when it is horizontally retracted from within said structure.

4. A structure as claimed in claim 3 wherein air vents are provided in said extensions through which air can be drawn into the structure via said passageways.

5. A structure as claimed in claim 1 wherein the ceiling is pivotally hinged at one or both of said sides, whereby the ceiling or parts thereof are pivotable to a position juxtaposing the side(s) of the structure.

6. A structure as claimed in claim 1 further comprising a turbogenerator located at said opening in the apex, said turbogenerator being driven by flow of air through said opening.

7. A structure as claimed in claim 1 wherein transparent or translucent sections are provided in the sides of the structure and in the ceiling, the transparent or translucent sections in the ceiling being arranged alternately with the sections in the sides whereby when the ceiling is pivoted or retracted, the transparent or translucent sections in the ceiling are juxtaposed with opaque sections of the sides, and vice versa.

8. A structure as claimed in claim 1 wherein said structure is a poultry shed, the poultry being housed in cages arranged on a platform a predetermined distance above the base of said structure, said air vents being located below the level of said cages.

9. A structure as claimed in claim 1 further comprising a solar powered heating system.

10. A structure for housing plants, or animals such as poultry, said structure comprising:
a base;
opposite sides extending upwardly from the base and inclined towards an apex at which there is provided an opening;
a ceiling situated a predetermined distance above the base;
horizontal lateral extensions at the sides of the structure;
said ceiling having horizontally movable portions adapted to be opened to allow the flow of air from below the ceiling to the opening at the apex of said structure, and closed to generally retain air within said structure; and
said extensions having passageways adapted to receive said ceiling portions when moved horizontally from within said structure.

11. A structure as claimed in claims 1 or 10 wherein air vents are provided at the base of the sides of said structure.

12. A poultry shed comprising:
- a base;
- angled sides extending upwardly from the base to an apex to form an A-frame structure;
- an apex vent at the apex;
- a poultry supporting platform positioned above the base;
- a ceiling positioned above the poultry supporting platform and extending from side to side, the ceiling including movable portions to permit air flow from a region below the ceiling, through the ceiling, through the region above the ceiling and through the apex vent when movable portions are open, and to substantially halt air flow from the region below the ceiling to the region above the ceiling when closed; and
- side air vents on the sides below the poultry supporting platform operable between open and closed positions to permit air flow from outside the structure, through opened side air vents, past the poultry, through opened movable ceiling portions and to the outside through the apex vent.

* * * * *